United States Patent
Wong et al.

(10) Patent No.: US 11,968,751 B2
(45) Date of Patent: Apr. 23, 2024

(54) TELECOMMUNICATIONS APPARATUS AND METHODS

(71) Applicants: Sony Group Corporation, Tokyo (JP); Sony Mobile Communications Inc., Tokyo (JP)

(72) Inventors: Shin Horng Wong, Basingstoke (GB); Martin Warwick Beale, Basingstoke (GB); Brian Alexander Martin, Basingstoke (GB); Basuki Priyanto, Basingstoke (GB); Nafiseh Mazloum, Basingstoke (GB)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 18/180,849

(22) Filed: Mar. 9, 2023

(65) Prior Publication Data
US 2023/0225011 A1    Jul. 13, 2023

Related U.S. Application Data

(63) Continuation of application No. 17/169,544, filed on Feb. 8, 2021, now Pat. No. 11,632,825, which is a
(Continued)

(30) Foreign Application Priority Data

May 5, 2017    (EP) .................................... 17169821

(51) Int. Cl.
*H04W 88/02* (2009.01)
*H04J 11/00* (2006.01)
(Continued)

(52) U.S. Cl.
CPC ......... *H04W 88/02* (2013.01); *H04J 11/0069* (2013.01); *H04W 4/029* (2018.02);
(Continued)

(58) Field of Classification Search
CPC .... H04W 88/02; H04W 48/12; H04J 11/0069
See application file for complete search history.

(56) References Cited

U.S. PATENT DOCUMENTS

2014/0307621 A1    10/2014 Frenger et al.
2016/0270013 A1*   9/2016 Soriaga ............... H04W 56/001
(Continued)

FOREIGN PATENT DOCUMENTS

JP    2016-522605 A    7/2016
KR    2015-0144330 A    12/2015
(Continued)

OTHER PUBLICATIONS

International Search Report and Written Opinion dated Jul. 31, 2018 for PCT/EP2018/061213 filed on May 2, 2018, 10 pages.
(Continued)

*Primary Examiner* — Justin Y Lee
(74) *Attorney, Agent, or Firm* — XSENSUS LLP

(57) ABSTRACT

A base station for transmitting system related information in a mobile telecommunications network. The base station is configured to transmit system information for the cell provided by the base station and to broadcast a version synchronisation signal, wherein the version synchronisation signal provides version information regarding the current version of the system information for the cell.

17 Claims, 7 Drawing Sheets

Related U.S. Application Data continuation of application No. 16/610,529, filed as application No. PCT/EP2018/061213 on May 2, 2018, now Pat. No. 10,939,499.

(51) Int. Cl.
| | |
|---|---|
| *H04W 4/029* | (2018.01) |
| *H04W 48/10* | (2009.01) |
| *H04W 48/12* | (2009.01) |
| *H04W 56/00* | (2009.01) |

(52) U.S. Cl.
CPC .......... *H04W 48/10* (2013.01); *H04W 48/12* (2013.01); *H04W 56/0015* (2013.01)

(56) References Cited

U.S. PATENT DOCUMENTS

| | | | |
|---|---|---|---|
| 2016/0316431 | A1 | 10/2016 | Zhu |
| 2016/0345118 | A1 | 11/2016 | Oh |
| 2017/0034798 | A1 | 2/2017 | Lin |
| 2017/0280372 | A1 | 9/2017 | Martin et al. |
| 2018/0324757 | A1 | 11/2018 | Chai et al. |
| 2019/0215828 | A1* | 7/2019 | Kim ...................... H04W 72/04 |
| 2020/0068477 | A1 | 2/2020 | Awada |

FOREIGN PATENT DOCUMENTS

| | | |
|---|---|---|
| WO | 2016/149026 A1 | 9/2016 |
| WO | WO-2016186696 A | 11/2016 |

OTHER PUBLICATIONS

Holma, H., and Toskala, A., "LTE for UMTS OFDMA and SC-FDMA Based Radio Access," System Architecture Based on 3GPP SAE, John Wiley and Sons, 2009, pp. 25-27.

White Paper, "Coverage Analysis of LTE-M Category-M1" Sierra Wireless, Ericsson, Altair, Sony, Virtuosys, AT&T, Verizon, Sequans, Orange, KDDI, Nokia, Docomo, KT, SoftBank, Telkomsel, SK Telecom, Version 1.0, Jan. 2017, pp. 1-20.

3GPP, "Revised WID for Further Enhanced MTC for LTE", Ericsson, 3GPP TSG RAN Meeting No. 73, RP-161464, New Orleans, USA, Sep. 19-22, 2016, 6 pages.

Huawei, et al., "Revised work item proposal: Enhancements of NG-IoT", 3GPP TSG RAN Meeting No. 73, RP-161901, New Orleans, USA, Sep. 19-22, 2016, pp. 8 pages.

Ericsson, et al., "New WID on Even further enhanced MTC for LTE", 3GPP TSG RAN Meeting No. 75, RP-170732, Dubrovnik, Croatia, Mar. 6-9, 2017, pp. 4 pages.

Huawei, et al., "New WID on Further NB-IOT enhancements", 3GPP Tsg Ran Meeting No. 75, RP-170852, Dubrovnik, Croatia, Mar. 6-9, 2017, 6 pages.

Qualcomm Incorporated, "Reduced system acquisition lime", 3GPP TSG RAN WG1 Meeting #88bis, R1-1705011, Spokane, USA, Apr. 3-7, 2017, total 3 pages.

Office Action dated Jan. 17, 2023, in corresponding Japanese patent Application No. 2019-560321, 6 pages.

ZTE et al., "Consideration on system acquisition lime reduction for MTC", 3GPP TSG RAN WG1 Meeting #88bis, R1-1705483, Apr. 3-7, 2017, Spokane, USA, total 4 pages.

Mediatek Inc., "Few issues on NB-PDSCH subframes", 3GPP TSG RAN WG1 NB-IoT Ad-Hoc Meeting, Mar. 22-24, 2016, pp. 1-4, R1-161947, Sophia Antipolis, France.

* cited by examiner

TELECOMMUNICATIONS APPARATUS AND METHODS

CROSS-REFERENCE TO RELATED APPLICATIONS

The present application is a continuation of U.S. application Ser. No. 17/169,544, filed Feb. 8, 2021, which is a continuation of U.S. application Ser. No. 16/610,529, filed Nov. 4, 2019 (now U.S. Issued U.S. Pat. No. 10,939,499), which is based on PCT filing PCT/EP2018/061213, filed May 2, 2018, which claims priority to EP 17169821.0, filed May 5, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems.

SUMMARY

Aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
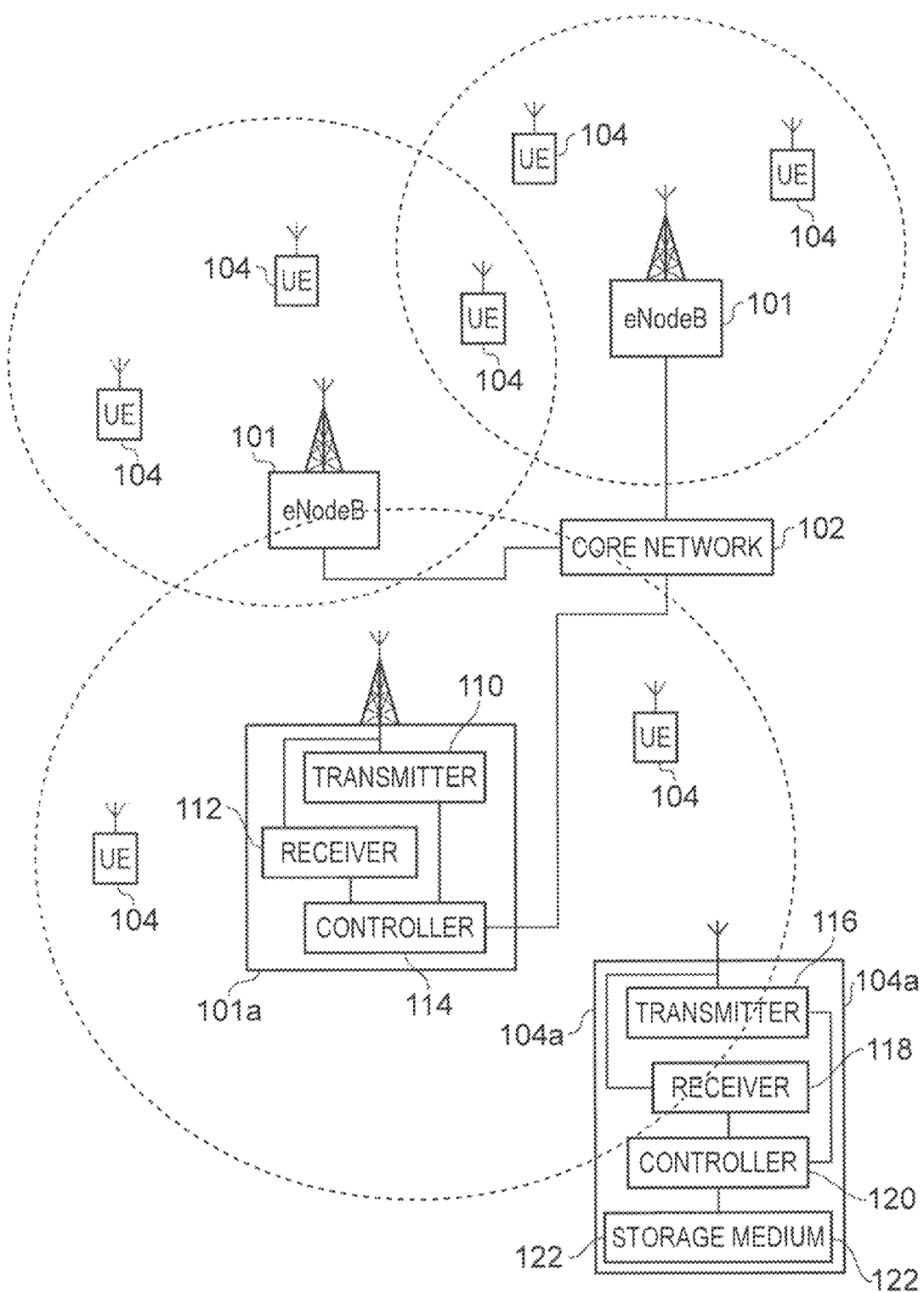
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [5]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 104 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 112 are controlled by a controller 120. In the embodiments of the present disclosure, the UE 104a is a terminal device configured to operate using feMTC (Further Enhanced Machine Type Communications) or eNB-IoT (Enhanced Narrowband Internet of Things).

In this example, the terminal device 104a comprises a transmitter 116 for transmission of wireless signals, a receiver 118 for reception of wireless signals, a controller 120 configured to control the terminal device 104a and a storage medium 122. The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 104a will in general comprise various other elements associated with its operating functionality, for example a power source, user interface, and so forth, but these are not shown in FIG. 1 in the interests of simplicity.

Mobile telecommunications systems such as those arranged in accordance with the 3G PP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 2.

Figure 2:
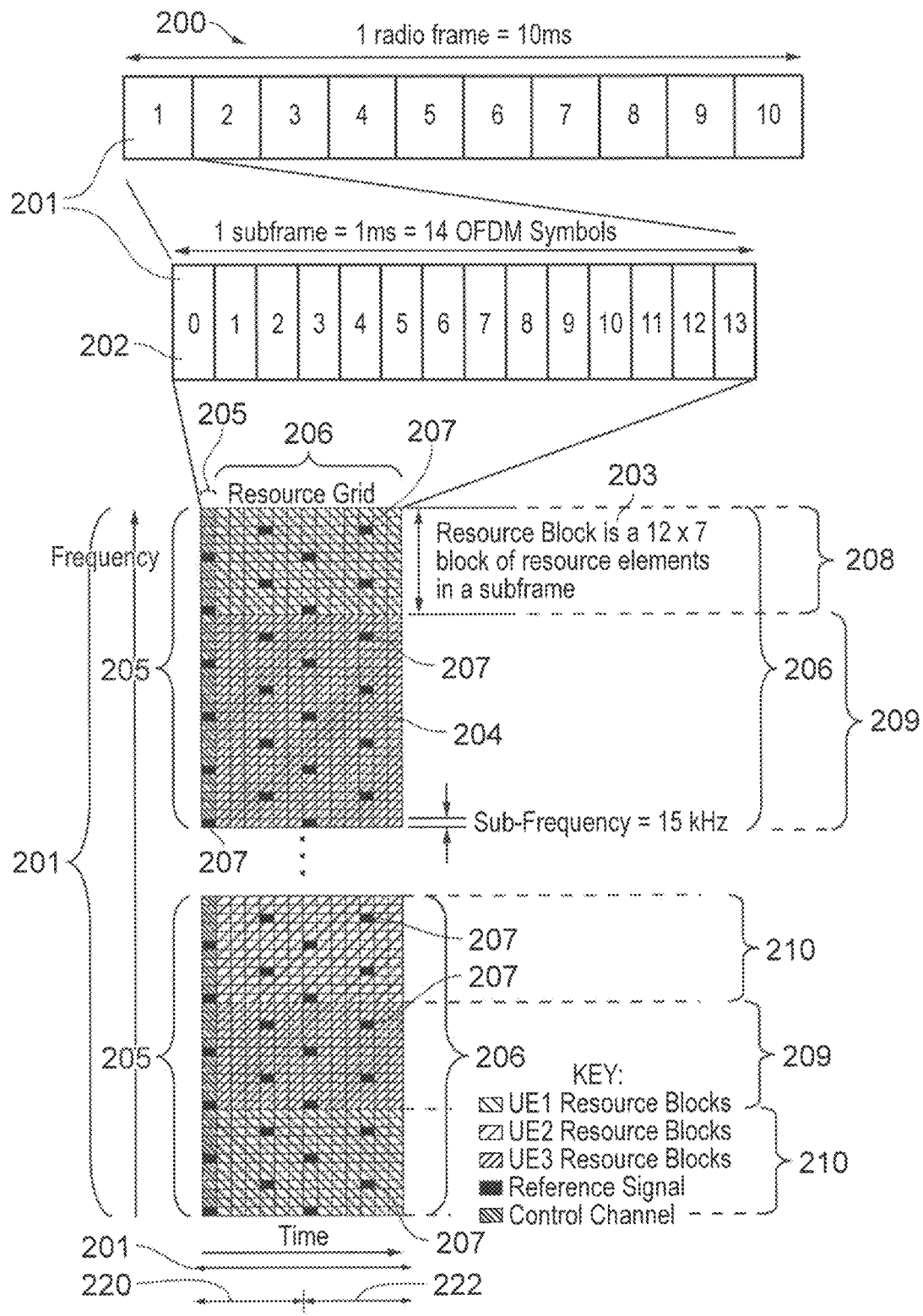
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form a scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the $7^{th}$ OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS) to detect the cell, and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1 that is transmitted via the PDSCH. SIB1 contains scheduling information for acquiring the remaining System Information portions (other SIBs). A terminal operating in coverage enhanced mode (which can for example be a machine-type or IoT terminal) requires numerous repetitions to be able to decode the PBCH and PDSCH channels carrying the System Information. Example estimates of the expected acquisition times for the PSS/SSS, PBCH (MIB) and SIB1 are shown in Table 1 for a deep coverage scenario.

TABLE 1

| Estimated 90% acquisition time at 164 dB MCL | |
| --- | --- |
| Channel | 90% Acquisition Time (ms) |
| PSS/SSS | 850 |
| PBCH (MIB) | 250 |
| PDSCH (SIB1) | 750 |

Table 1 shows the 90-th percentile of the time required to detect each signal. As can be seen in this table, a significant amount of time and energy needs to be spent on system information acquisition in the deep coverage scenario, once synchronisation has been achieved. It can thus be desirable to try to reduce or eliminate the time and/or power used for system acquisition, that is for acquiring the MIB and SIBs (using the current terminology).

Legacy terminals (MTC terminals or otherwise) use the existing PSS/SSS which occupy only 1 OFDM symbol each and are transmitted twice every radio frame.

Figure 3:
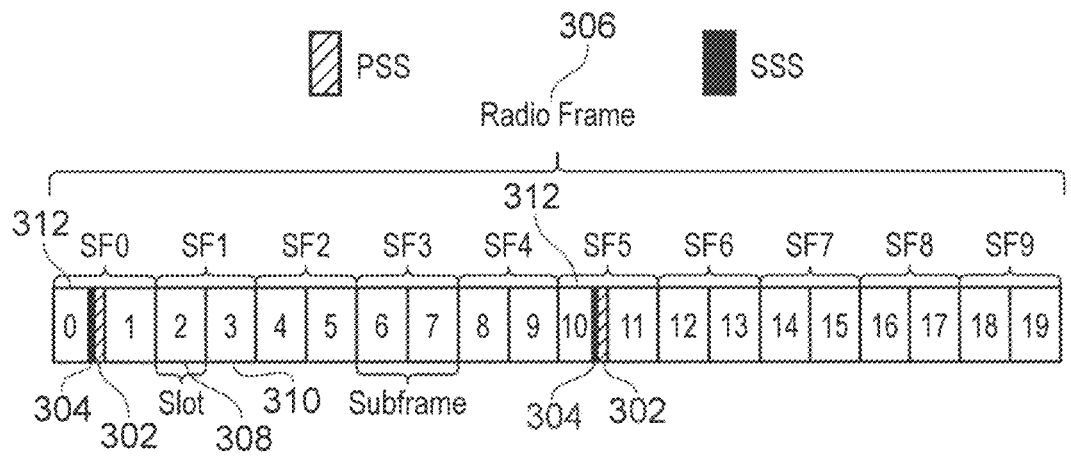
FIG. 3 schematically represents the transmission of the synchronisation signals in an FDD LTE system.

This is illustrated in FIG. 3 which represents the transmission of the synchronisation signals in an FDD LTE system.

FIG. 3 schematically represents the transmission of the synchronisation signals in an FDD LTE system. FIG. 3 shows a radio frame 306, divided into 10 subframes, SF0-SF9. Each of the subframes SF0-SF9 consists of two slots; for example, the subframe SF1 comprises slot 2 308 and slot 3 310.

Here the PSS 302 (represented by hatching) is transmitted in the last OFDM symbol of Slot 0 310 (Subframe 0, SF0) and Slot 10 312 (Subframe 5, SF5) whilst the SSS 304 (represented by a solid block) is transmitted in the second to last OFDM symbol of Slot 0 (Subframe 0 SF0) and Slot 10 (Subframe 5 SF5). Due to the synchronisation signals being transmitted with a small amount of resources in both the time and frequency domains, in a coverage enhanced mode the resulting time needed to synchronise with the cell can be much longer than desired.

In accordance with the present disclosure, there can be provided one or more additional synchronisation signals/channels (such as one or more PSS/SSS-like signals) with a view to reducing the overall acquisition time. The additional synchronisation signal(s) can be used for terminals to decide or estimate whether to acquire the system information or whether the last system information they have used is still expected to be up-to-date. Viewing from a different perspective, there is provided an arrangement wherein a new MTC Synchronisation Signal "MSS" is transmitted, wherein this MSS carries information related to system acquisition.

In some examples, the additional synchronisation signal(s) can also be transmitted more frequently (i.e. more densely in the time dimension) than the conventional/existing PSS and SSS signals. This can enable a terminal using a coverage enhanced mode to accumulate the required number of synchronisation samples more quickly.

In a first example aspect, the MSS has a different sequence and/or scrambling to that used for the PSS and SSS. Accordingly, legacy terminals would not be able to detect the MSS, which would otherwise result in the legacy terminals receiving the synchronisation signals and in advertently using these signals to synchronise to the cell in an erroneous manner. As mentioned above, it is expected that in many cases, the MSS would be denser, i.e. transmitted more often (e.g. transmitted in more OFDM symbols per slot and/or in more slots per radio frame) than the legacy PSS & SSS so that the terminal would be able to synchronise with the cell faster than using only the conventional PSS & SSS.

The MSS can provide a number of different types of information regarding system acquisition (i.e. system acquisition information). In an embodiment the system acquisition information can be an indication of System Information "SI" change. An SI change can for example be indicated if there are any changes to the contents carried by the MIB and/or SIB. In a legacy system, an SI change can be indicated via paging where a terminal then needs to blind detect for MPDCCH to receiving the paging. According to the present disclosure, the SI change information can be indicated using a different MSS sequence/scrambling configuration (similar to the way that a different sequence or scrambling for the PSS/SSS signals can be used to signal the Cell ID).

The terminal can then attempt to decode the MSS based one of two hypotheses, that is a first hypothesis of a sequence and/or scrambling assuming SI change and a second hypothesis of another sequence and/or scrambling assuming no SI change. Hence by detecting the MSS the UE can decide whether to skip reading the SIBs (if there is no SI change) or to read the SIBs. This example recognises that SI changes are expected to be rare and hence for a majority of the time, a UE would have already acquired the latest SI and would therefore skip reading the SIBs in most cases, thereby saving time and battery.

In some examples the MSS can indicate whether there has been a system information change within a period preceding the transmission of the MSS, for example in the frame before the MSS transmission, in the last n sub-frames before the MSS transmission, or any other suitable predetermined period.

In the discussion above, the MSS can indicate a system information change or alternatively no system information change through the MSS sequence/scrambling configuration applied. Hence the MSS sequence/scrambling configuration applied can be interpreted as providing an MSS indicator with a value "0" or "1".

In some examples, this change can be encoded either using "0" to indicate "no change" or "1" to indicate "SI has changed". In other examples, the MSS can switch between "0" and "1" whenever there is a change and continue communicating the same "0" or "1" value until the next change in system information. For example, if the MSS was indicating "0" prior to a change, the MSS can then indicate "1" after an SI change and will continue to indicate "1" for as long as the SI does not change. This example is illustrated in FIG. 4A.

Figure 4A:
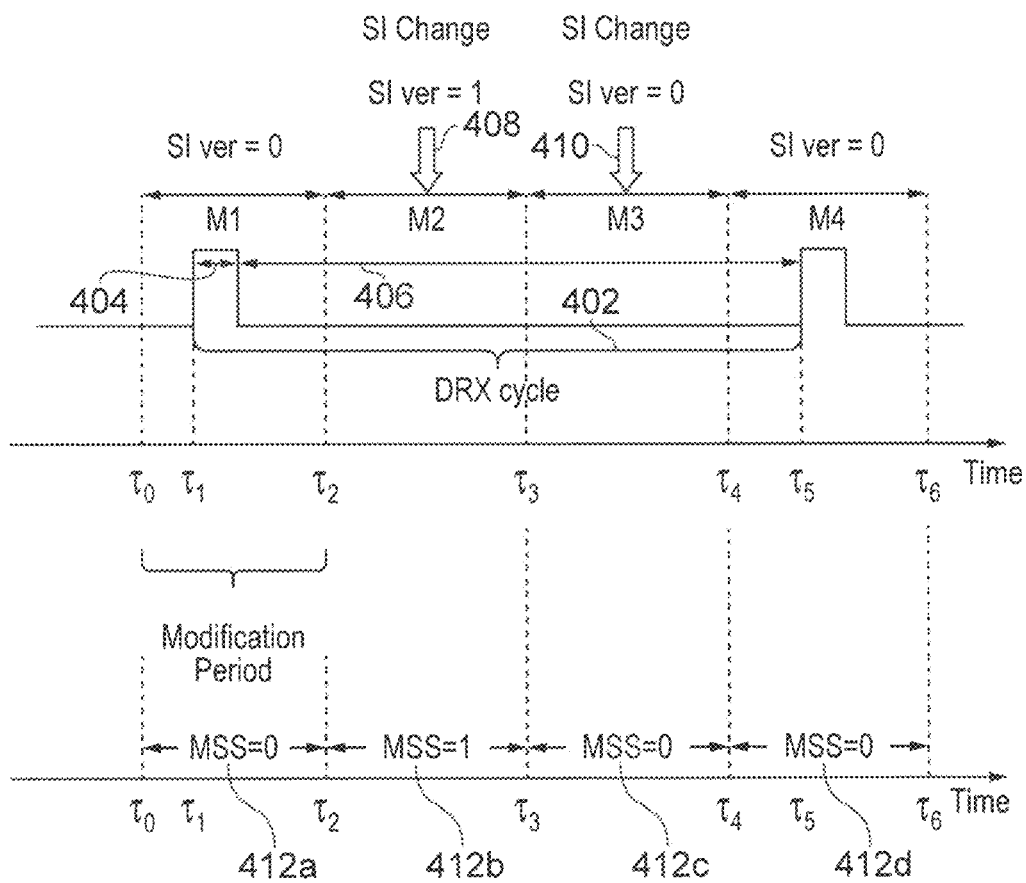
FIG. 4A illustrates an example of a synchronisation signal transmission indicating a system information version.

FIG. 4A illustrates an example of a synchronisation signal transmission indicating a system information version, during a time period comprising four contiguous modification periods indicated by respective double-headed arrows labelled M1-M4 and covering time periods, respectively, from τ0 to τ2, from τ2 to τ3, from τ3 to τ4, and from τ4 to τ6.

A DRX cycle 402 extends from time τ1 to τ5 and comprises an 'on' period 404 and an 'off' (or DRX mode) period 406.

MSS indicators 412a-d are transmitted during the modification periods M1-M4.

SI changes within modifications periods M2 and M3 are respectively indicated by arrows 408 and 410.

FIG. 4A shows that as the SI changes, the indicator changes from 0 to 1 for the next modification period, then back to 0 after it changes again. As the SI has not changed for the last time period, it remains 0 during this time period. Although this example enables a straightforward application and implementation, in some examples it also has some limitations. For example, a terminal receiving the MSS at times $\tau_1$ and $\tau_5$ might not realise that the system information has changed (twice) and would thus not attempt to receive the new system information.

Figure 4B:
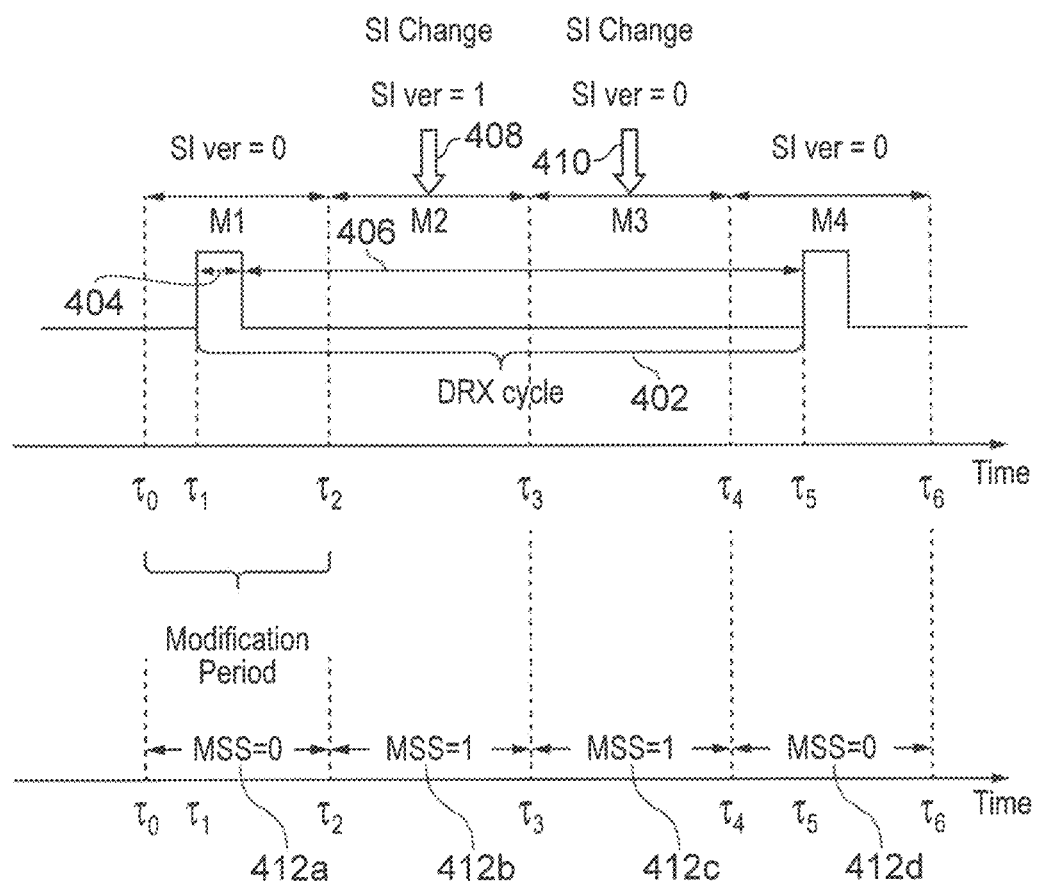
FIG. 4B illustrates another example of a synchronisation signal transmission indicating a system information version.

FIG. 4B illustrates an alternative arrangement for an MSS providing a 0/1 indicator (as in FIG. 4A, and like reference numerals are used for like features) wherein a first of the two "0" or "1" values indicates that the system information has changed relative to a predetermined period preceding the MSS transmission (the modification period), whereas the other of the "0" and "1" values indicates that the system information has not changed in this period. In this example the modification period is expected to correspond to a number of PSS/SSS cycles. Although in practice, it is expected that an implementation similar to that of FIG. 4A would be preferred (as it provides an indication of the current version of system information regardless of how long ago it last changed), in some examples, an implementation as illustrated in FIG. 4B might be considered useful (depending for example on how long the DRX cycles are expected to be and depending on what the modification period will be configured to be).

In some examples, the system acquisition information can contain an SI version. Similar to the previous example where the MSS indicator switches between 0 and 1 at every change, the terminal upon detecting the MSS would be able to determine whether the SI has changed by comparing the SI version that it has versus the SI version indicated by the MSS. From one perspective, the example discussed above and illustrated in FIG. 4A can be viewed as having only two versions where the SI indicator can indicate version "0" or version "1". Using a (more advanced) SI version can allow the SI change to indicate more than 2 versions. This recognises that the terminal can be in a long DRX period and hence may miss two or more SI indicator changes. For example, in FIG. 4A where only two version "0" or "1" can be indicated, the terminal DRX cycle 402 from time $\tau_1$ to $\tau_5$ spans four modification periods M1, M2, M3 and M4. In this example, the SI change can indicate version "0" or "1" and changes twice while the terminal is in the DRX mode 406.

More specifically, when the terminal wakes up at time Ti it detects the SI change indicator is set to "0" which is the same version as that in the terminal's memory and hence there is no SI change indicated and the terminal goes back to sleep. During the terminal's sleep period, there are two SI changes 408, 410: in modification period M2 (between time $\tau_2$ to $\tau_3$) and M3 (between time 13 to $\tau_4$) and hence during M2, the SI change indicator 412*b* toggles to "1" and during M3 it toggles 412*c* to "0". When the terminal wakes up at time $\tau_5$, the SI version 412*d* is "0" which matches the version in the terminal's memory and the terminal assumes no changes to the SI. However, as the SI has changed twice already, the terminal may no longer have an up-to-date version of the SI. Hence by allowing the MSS to indicate more than two SI versions avoids the SI versions from wrapping around without the terminal noticing. Each SI version can be represented by a separate sequence and/or scrambling.

In another example, the system acquisition information can be an indication of changes to the information carried by the MIB apart from the SFN. Apart from the System Frame Number "SFN" (which changes every 4 radio frames in the MIB), the MIB carries information such as system bandwidth information as well as scheduling and configuration information for SIB1. Hence by detecting the MSS the terminal can determine or estimate whether to skip reading the MIB (if it still has the correct SFN information) or to read the MIB. Accordingly, unnecessary decoding of the MIB can be reduced or avoided with such an arrangement.

In some examples, the MSS can be transmitted in a different narrowband to that of the LTE PSS/SSS. The current LTE PSS & SSS are located in the central narrowband in a system bandwidth. By transmitting the MSS in a different narrowband, this can provide flexibility in scheduling the MSS. This can also allow the MSS to occupy contiguous resources in time with a view to accelerating the acquisition process. It is noteworthy that if the MSS occupies the central 6 PRBs (central narrowband currently used for PSS/SSS transmissions), it may not always be provided in time-contiguous resources. In particular, as the legacy PSS/SSS and MIB also occupy the central 6 PRBs and the MSS might have to be mapped to non-contiguous resources around these signals).

In some examples, the narrowband containing the MSS can be detected by the terminal when it first switches on. For example, instead of (or in addition to) scanning for PSS/SSS, it can scan for MSS to try to synchonize to the cell. This can be particularly relevant for terminals that are not expected to be mobile (e.g. smart meters) which are unlikely to change cell and can then assume as a first hypothesis that the cell has not changed and the same cell has not changed the location of the MSS. The location of the MSS can also be signalled by the network, for example in SIB or in RRC configuration so that it can be used for re-acquisition (e.g. if the UE first connects to the cell using the PSS/SSS, it can read the system information or an RRC configuration that informs the UE of the location of the MSS and the UE can use that MSS in future acquisitions of the cell).

It should also be noted that the MSS can be used by an HD-FDD terminal during its Uplink Compensation Gap "UGC" to re-acquire synchronisation after a long uplink transmission. Here the terminal can switch to the downlink narrowband containing the MSS. When an MSS is used that allows the terminal to synchronise more quickly (than for the legacy case where the UE synchronises using the PSS/SSS), the duration of the UCG can be reduced compared to the legacy case.

In an example, if the terminal is configured to monitor MSS (or the UE signals to the network that it can detect MSS), it applies a shorter UCG. This has the benefit of reducing the latency for transmission of UL messages and can reduce terminal power consumption (since the terminal can switch to a low power state earlier if it can complete an UL transmission earlier).

In another embodiment the MSS can also indicate where the central narrowband is. This is especially relevant if MSS is used for initial acquisition (i.e. a "cold start", when the terminal is first switched on) where the terminal tries to detect for MSS and the MSS is in a different narrowband to that of the PSS/SSS & PBCH. Hence the MSS can indicate where (relative to the location of the MSS) the terminal can obtain the PBCH. In some cases, no indication can be interpreted as meaning that both MSS and PBCH are located at the same frequency. In other cases, even when the MSS and PBCH are located in the same band, the MSS may still include an indication of the location of the PBCH (i.e. in the same frequency band). Such indications can be transmitted by the use of different MSS sequences, or different scrambling applied to MSS.

In an example, the set of possible MSS sequences is a function of the Cell ID. The sequences in such a set of MSS sequences are used to indicate information as discussed herein. Here, for each Cell ID there is a different set of sequences. Hence by detecting the MSS the terminal will also learn of the Cell ID. This enables the MSS to be used for initial acquisition, for example instead of the PSS and SSS.

While the MSS may be transmitted in the same narrowband, in other examples the MSS can use different bands and may rely on a "frequency hopping" arrangement as will be discussed below.

In an example where Frequency Hopping (FH) is used for the MSS, this can provide gain (e.g. frequency diversity gain) for the MSS, thereby reducing the number of samples required by a terminal in coverage enhanced mode, which in turn is expected to lead to faster system acquisition. The frequency hopping pattern can be based on the Cell ID and/or configured by the network. It should be appreciated that when frequency hopping is used, it may be difficult for terminal to use MSS when it is first switched on (e.g. in the case where the MSS is frequency hopped at known time intervals) and this may be used more frequently in "warm start" situations).

Although the MSS can be transmitted at more than two (or more) frequency locations for a FH arrangement (i.e. transmitted as two separate signals), in the interest of conciseness, the examples below discuss two narrowbands only (i.e. the MSS is transmitted in two separate frequency bands). However the skilled person will appreciate that the same teachings can also be applied to three or more bands.

Figure 5:
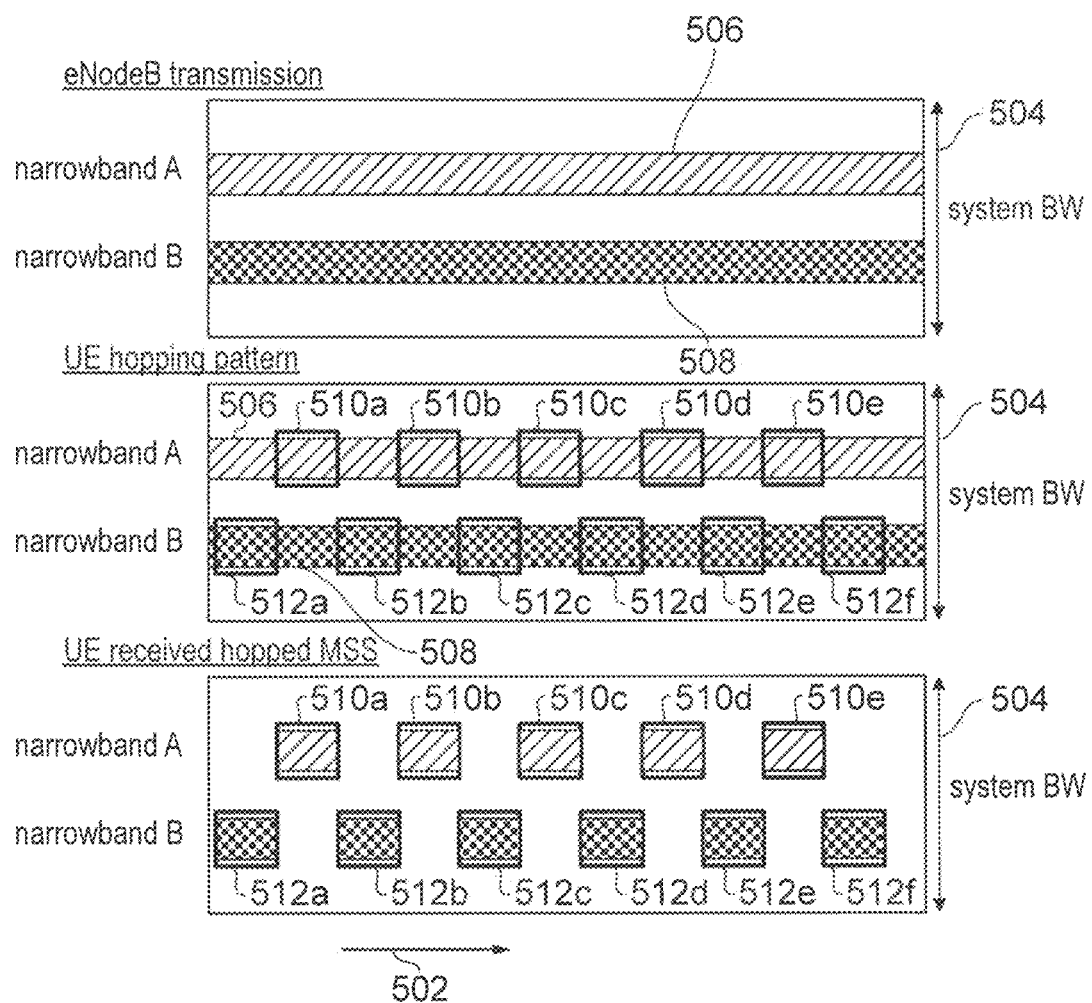
FIG. 5 illustrates an example of use of resources for transmitting and receiving a synchronisation signal.

FIG. 5 illustrates an example time period in a time dimension (illustrated by arrow 502) within a system bandwidth 504. Accordingly, in this example the MSS is transmitted by the eNodeB with FH using two narrowbands continuously and the terminal frequency hops its receiver to receive at one or the other of those frequency locations. The first narrowband ("narrowband A") is represented by the diagonally hatched region 506 within the system bandwidth 504, and the second narrowband ("narrowband B") is represented by the checkerboard region 508 within the system bandwidth 504. In this way, the terminal is able to achieve frequency diversity for the MSS without knowing a time-based hopping pattern—that is, the terminal does not have to be aware of the time at which the MSS is transmitted as it is transmitted continuously in two narrowbands. This example is illustrated in FIG. 5 which shows the eNodeB continuously transmitting MSS at two frequency locations (narrowband A 506 and narrowband B 508—see top time diagram). On the other hand, the terminal implements a hopping pattern between narrowband A and narrowband B (receiving within resources indicated by the black boxes 510a-510e in narrowband A 506 and within resources indicated by the black boxes 512a-512f in the middle time diagram) and hence receives a frequency hopped version of MSS (comprising the portions of the MSS transmitted in the first narrowband 506 which are received in the resources 510a-510e and the portions of the MSS transmitted in the second narrowband 508 which are received in the resources 512a-512e—see bottom time diagram in FIG. 5).

Figures 6, 7:
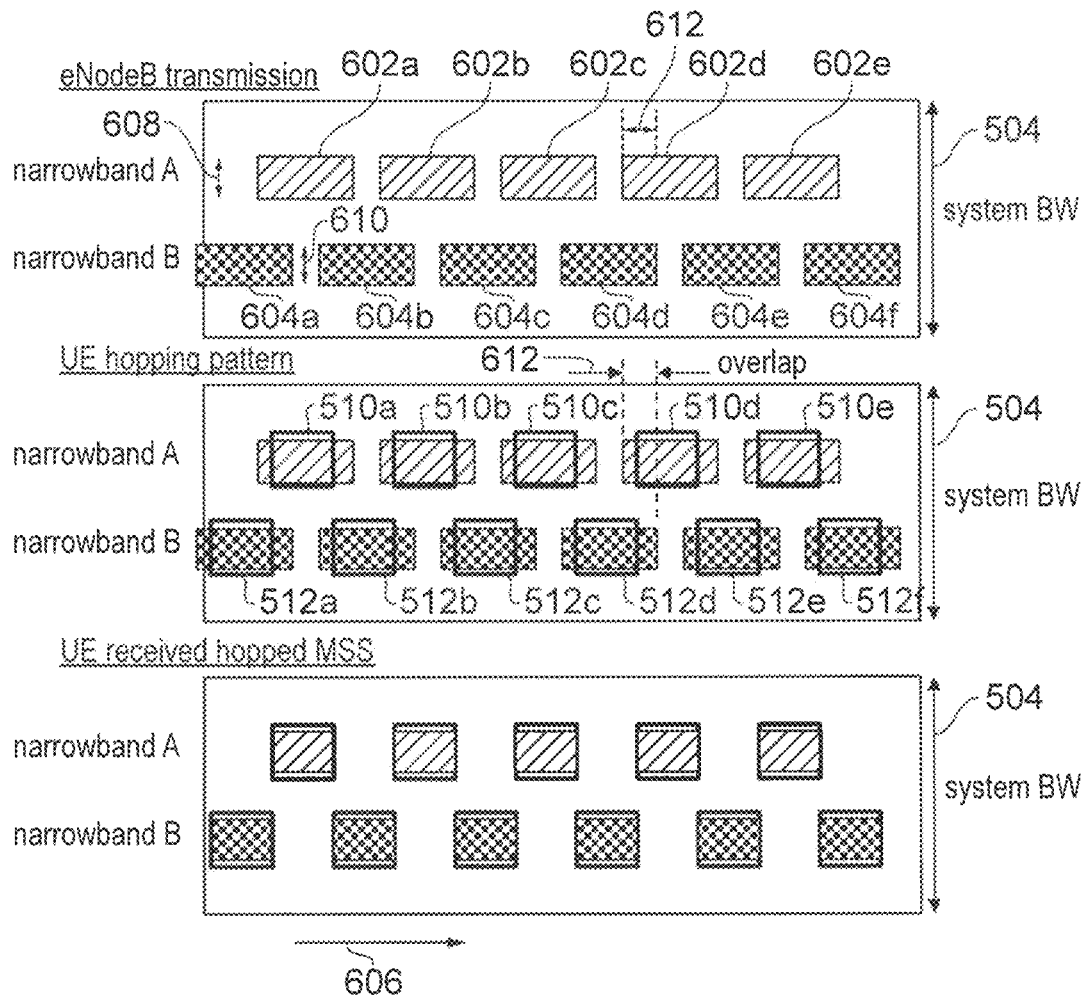
FIG. 6 illustrates another example of use of resources for transmitting and receiving a synchronisation signal.
FIG. 7 illustrates an example method in accordance with the present disclosure.

In yet another example (which can also be seen as a combination of the time and frequency "hopping" discussed above), the eNodeB can transmit the MSS at different frequency locations in overlapping blocks of time, as illustrated in FIG. 6 for example.

FIG. 6 illustrates the transmissions of the eNodeB using a first narrowband portion 608 ("narrowband A") of the system bandwidth 504 during a plurality of non-contiguous time periods illustrated by diagonally hatched rectangles 602a-602e. In addition, the eNodeB transmits using a second narrowband portion 610 ("narrowband B") of the system bandwidth 504 during a plurality of non-contiguous time periods illustrated by checkerboard-patterned rectangles 604a-604f.

This figure shows that the eNodeB can transmit the MSS in a non-contiguous fashion (in the time domain 606) at two different frequency locations (i.e. in a non-contiguous manner in the frequency domain). The terminal can then frequency-hop between those frequency locations 608, 610 at the expected MSS transmission time. In some examples, the transmission of the MSS 602a-602e, 604a-604f is longer than the expected receiving time 510a-510e, 512a-512f, thereby causing an "overlap" (see for example, the time period 612 of FIG. 6) wherein at a point in time the MSS is transmitted in two separate bands 608, 610. This can for example assist with accommodating timing error at the terminal provided that it is less than the "overlap" 612 shown in the figure.

In an example, the terminal is informed or is always aware of the MSS physical resources in the time and frequency domain. For example, the terminal may receive or have information that can include a narrowband index for the narrowband carrying MSS, information regarding the OFDM symbol(s) carrying MSS, information regarding the MSS FH pattern (if any) etc. This configuration of the MSS is particularly beneficial in the following two cases:

Warm start. When the terminal has previously acquired and read system information or has been in an RRC_connected state in a cell, it can receive configuration information on that cell (including the MSS configuration) that will allow the terminal to receive the MSS when it re-acquires system information of that cell. For example a stationary terminal that sleeps for a long period of time can initially attempt to re-acquire the cell using the configured MSS when it wakes from sleep. As it is stationary it will likely be using the same cell as before it went to sleep and might thus be able to confirm that its existing SI (previously acquired) is still valid.

Mobility. The terminal can be informed of MSS configurations in neighbour cells via Information Elements ("IEs") in a neighbour cell list. When the terminal performs neighbour cell measurements, it can also then perform those neighbour cell measurements directly on the MSS.

In a "cold start" case (when the terminal is likely unaware of MSS configuration of the cell), it can synchronise using either the legacy PSS/SSS or using blind detection hypotheses on potential MSS configurations. However in some cases a terminal might be able to use the MSS instead. For example a stationary terminal (e.g. smart meter) may first attempt to use its last MSS configuration for attempting a fast system acquisition, if possible. If this fails, the terminal can then fall back on the legacy techniques with the PSS/SSS. In some examples, in a "cold start" case and where the terminal will try to detect either the PSS/SSS or MSS, the spacing between two PSS/SSS and MSS synchronization signals can be in a predefined multiple frequency spacing. For example in an LTE environment, the frequency spacing, also referred to as frequency raster, is a multiple of 100 kHz and the same frequency spacing can be used between the PSS/SSS signal on one hand and the MSS signal on the other hand.

More generally, in some cases the terminal may first attempt to gain synchronisation using the MSS and the last MSS configuration it has. If it fails to synchronise using MSS (e.g. a timer expires before a MSS can be detected), different options are available to the terminal and can be configured in the terminal. Generally, the following functionalities (providing fallback mechanisms) may be implemented in a terminal:

Prioritise MSS:
    It first attempts to gain synchronisation using MSS of previously configured neighbour cells.
    If unsuccessful, it then attempts to gain synchronisation using PSS/SSS of the previous serving cell
    If unsuccessful, it then attempts to gain synchronisation using PSS/SSS of any cell Prioritise serving cell
    It first attempts to gain synchronisation using PSS/SSS of the previous serving cell
    If unsuccessful, it then attempts to gain synchronisation using MSS of previously configured neighbour cells.
    If unsuccessful, it then attempts to gain synchronisation using PSS/SSS of any cell The above fallback mechanisms may be beneficial for example if the eNodeB can change the configuration of its MSS (e.g. turn it on or off) or the terminal can move to cells that do not implement MSS, but only implement the legacy PSS/SSS.

In an embodiment, the MSS can be transmitted at times derived from a DRX cycle. For example, the MSS may be transmitted only during UCG periods of active terminals, or the MSS may be transmitted prior to paging occasions. This functionality can enable terminals that have previously connected to the cell to synchronize more quickly (e.g. at paging occasions, for receiving mobile terminated messages), while minimizing the resources used for MSS transmission. However terminals that wish to transmit mobile originated messages would have to wait for DRX cycles before being able to synchronize and transmit those UL messages, thus increasing latency for these terminals.

It is also noteworthy that although the MSS has been generally described as a single signal, the skilled person will appreciate that in some examples it may be provided as two or more separate signals. For examples, similarly to the use of two synchronisation signals PSS/SSS for legacy synchronisation, the terminal may be able to search for and detect two different signals, MSS1 and MSS2, to synchronise and determine system related information (e.g. indication of a change of or a version of system information).

FIG. 7 illustrates an example method in accordance with the present disclosure for providing an MSS-type signal in accordance with techniques discussed herein. First, at S701, a base station is provided wherein the base station is configured to transmit system information for the cell it provides. For example the system information comprises the MIB and/or SIB as used in an LTE telecommunications system.

Then at S702, the base station broadcasts a version synchronisation signal (e.g. MSS). The version synchronisation signal provides version information regarding the current version of the system information for the cell. Accordingly, this can reduce the number of cases where a terminal may attempt to receive the system information for the cell.

Figure 8:
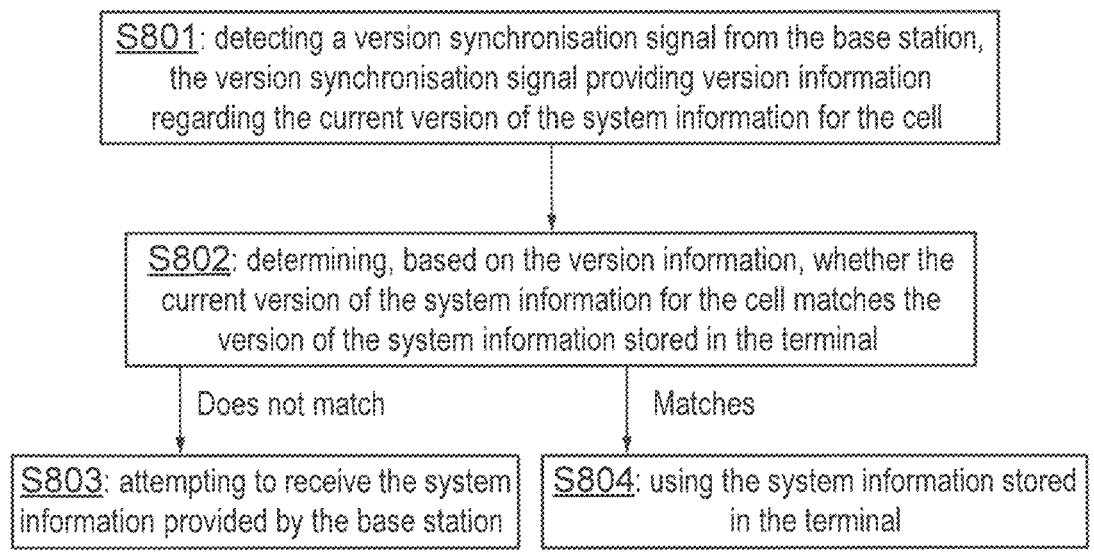
FIG. 8 illustrates another example method in accordance with the present disclosure.

FIG. 8 illustrates another example method in accordance with the present disclosure. First, at S801, a version synchronisation signal (e.g. MSS) from the base station is detected by a terminal. The version synchronisation signal provides version information regarding the current version of the system information for the cell.

Then, once the version synchronisation signal has been received, the terminal can determine, based on the version information, whether the current version of the system information for the cell matches the version of the system information stored in the terminal (S802).

If no match is found, the method proceeds to S803 and the terminal attempts to receive the system information provided by the base station. If on the other hand a match is found, the terminal can use the system information stored in the terminal (S804).

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE/5G environment such that several signals at a lower layer correspond to a single message at a higher layer. Also, transmissions too or from a terminal may relate to the transmission of any one or more of user data, discovery information, control signalling and any other type of information to be transmitted unless specified otherwise.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

It is noteworthy that even though the present disclosure has been discussed in the context of LTE and/or its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard Respective features of the present disclosure are defined by the following numbered examples:

Example 1. A base station for transmitting system related information in a mobile telecommunications network, the base station being configured
  to transmit system information for the cell provided by the base station,
  to broadcast a version synchronisation signal, wherein the version synchronisation signal provides version information regarding the current version of the system information for the cell.

Example 2. The base station of Example 1 further configured to broadcast a further synchronisation signal wherein the further synchronisation signal is for use for terminals to achieve synchronisation with the cell.

Example 3. The base station of Example 2 further configured to broadcast the version synchronisation signal more frequently than the further synchronisation signal.

Example 4. The base station of Example 2 or 3 further configured to broadcast the further synchronisation signal periodically at a first time frequency and the version synchronisation signal periodically at a second time frequency, the second time frequency being higher than the first time frequency.

Example 5. The base station of any one of Examples 2 to 4 further configured to broadcast the version synchronisation signal based on one or both of:
  a sequence that differs from a sequence used for transmitting the further synchronisation signal; and a scrambling configuration that differs from a scrambling configuration used to transmit the further synchronisation signal.

Example 6. The base station of any one of Examples 1 to 5 further configured to broadcast the version synchronisation signal based on a number, the number indicating the current version of the system information for the cell, wherein the number is used to derive one or both of a sequence and a scrambling configuration for transmitting the version synchronisation signal.

Example 7. The base station of any one of Examples 1 to 6 wherein the version information regarding the current version of the system information for the cell comprises one or more of:
  an indication that the current version of the system information has changed compared to a previous version of the system information that was in use at a previous point in time;
  an indication that the current version of the system information has changed compared to a previous version of the system information that was in use at a previous point in time wherein the previous point in time is identified based on a predetermined time difference; and
  an indication of a current version number, the version number being incremented at each system information change, the version number being selected from a circular list of n elements, with $n \geq 2$.

Example 8. The base station of any one of Examples 1 to 7 further configured to provide the version synchronisation signal as two or more separate signals forming together the version synchronisation signal.

Example 9. The base station of any one of Examples 1 to 8 further configured to broadcast the version synchronisation signal using two or more separate frequency bands.

Example 10. The base station of Example 9 further configured to broadcast the version synchronisation signal according to one or more of:
  a transmission of a first portion of the version synchronisation signal as a continuous signal in a first of the two or more separate frequency bands or as a non-contiguous signal in the first frequency band; and
  a transmission of a second portion of the version synchronisation signal as a continuous signal in a second of the two or more separate frequency bands or as a non-contiguous signal in the second frequency band.

Example 11. Circuitry for a base station transmitting system related information in a mobile telecommunications network, wherein the circuitry comprises a controller element and a transceiver element configured to operate together to:
  transmit system information for the cell provided by the base station,
  broadcast a version synchronisation signal, wherein the version synchronisation signal provides version information regarding the current version of the system information for the cell.

Example 12. A method of transmitting system related information in a mobile telecommunications network, the network comprising a base station configured to transmit system information for the cell provided by the base station, the method comprising:
  broadcasting, by the base station, a version synchronisation signal,
  wherein the version synchronisation signal provides version information regarding the current version of the system information for the cell.

Example 13. The method of Example 12 further comprising broadcasting, by the base station, a further synchronisation signal wherein the further synchronisation signal is for use for terminals to achieve synchronisation with the cell.

Example 14. The method of Example 13 wherein the version synchronisation signal is transmitted more frequently than the further synchronisation signal.

Example 15. The method of Example 13 or 14 wherein the further synchronisation signal is transmitted periodically at a first time frequency and the version synchronisation signal is transmitted periodically at a second time frequency, the second time frequency being higher than the first time frequency.

Example 16. The method of any one of Examples 13 to 15 wherein the version synchronisation signal is transmitted based on one or both of:
  a sequence that differs from a sequence used for transmitting the further synchronisation signal; and
  a scrambling configuration that differs from a scrambling configuration used to transmit the further synchronisation signal.

Example 17. The method of any one of Examples 12 to 16 wherein the version synchronisation signal is transmitted based on a number, the number indicating the current version of the system information for the cell, wherein the number is used to derive one or both of a sequence and a scrambling configuration for transmitting the version synchronisation signal.

Example 18. The method of any one of Examples 12 to 17 wherein the version information regarding the current version of the system information for the cell comprises one or more of:
  an indication that the current version of the system information has changed compared to a previous version of the system information that was in use at a previous point in time;
  an indication that the current version of the system information has changed compared to a previous version of the system information that was in use at a previous point in time wherein the previous point in time is identified based on a predetermined time difference; and
  an indication of a current version number, the version number being incremented at each system information change, the version number being selected from a circular list of n elements, with $n \geq 2$.

Example 19. The method of any one of Examples 12 to 18 wherein the version synchronisation signal is provided as two or more separate signals forming together the version synchronisation signal.

Example 20. The method of any one of Examples 12 to 19 wherein the version synchronisation signal is transmitted using two or more separate frequency bands.

Example 21. The method of Example 20 wherein the version synchronisation signal is transmitted according to one or more of:
- a transmission of a first portion of the version synchronisation signal as a continuous signal in a first of the two or more separate frequency bands or as a non-contiguous signal in the first frequency band; and
- a transmission of a second portion of the version synchronisation signal as a continuous signal in a second of the two or more separate frequency bands or as a non-contiguous signal in the second frequency band.

Example 22. A terminal for receiving system information in a mobile telecommunications network, the network comprising a base station configured to transmit system information for the cell provided by the base station, the terminal being configured to:
- detect a version synchronisation signal from the base station, the version synchronisation signal providing version information regarding the current version of the system information for the cell;
- determine, based on the version information, whether the current version of the system information for the cell matches the version of the system information stored in the terminal; and
- use, if the current version of the system information for the cell matches the version of the system information stored in the terminal, the system information stored in the terminal.

Example 23. The terminal of Example 22 further configured to:
- attempt, if the current version of the system information for the cell does not match the version of the system information stored in the terminal, to receive the system information provided by the base station.

Example 24. The terminal of Example 22 or 23 further configured to:
- determine, if the current version of the system information for the cell does not match the version of the system information stored in the terminal, location information from the version synchronisation signal, the location information identifying time and frequency resources for receiving the system information provided by the base station; and
- attempt to receive the system information using the location information.

Example 25. Circuitry for terminal for receiving system information in a mobile telecommunications network, the network comprising a base station configured to transmit system information for the cell provided by the base station, wherein the circuitry comprises a controller element and a transceiver element configured to operate together to:
- detect a version synchronisation signal from the base station, the version synchronisation signal providing version information regarding the current version of the system information for the cell; determine, based on the version information, whether the current version of the system information for the cell matches the version of the system information stored in the terminal; and
- use, if the current version of the system information for the cell matches the version of the system information stored in the terminal, the system information stored in the terminal.

Example 26. A method of receiving system information at a terminal in a mobile telecommunications network, the network comprising a base station configured to transmit system information for the cell provided by the base station, the method comprising the terminal:
- detecting a version synchronisation signal from the base station, the version synchronisation signal providing version information regarding the current version of the system information for the cell;
- determining, based on the version information, whether the current version of the system information for the cell matches the version of the system information stored in the terminal; and
- if the current version of the system information for the cell matches the version of the system information stored in the terminal, using the system information stored in the terminal.

Example 27. The method of Example 26 further comprising the terminal:
- if the current version of the system information for the cell does not match the version of the system information stored in the terminal, attempting to receive the system information provided by the base station.

Example 28. The method of Example 26 or 27 further comprising the terminal:
- if the current version of the system information for the cell does not match the version of the system information stored in the terminal, determining location information from the version synchronisation signal, the location information identifying time and frequency resources for receiving the system information provided by the base station; and
- attempting to receive the system information using the location information.

Example 29. A mobile telecommunications network, the network comprising a base station configured t transmit system information for the cell provided by the base station and comprising a terminal, the network being configured to:
- broadcast, via the base station, a version synchronisation signal to the plurality of terminals, wherein the version synchronisation signal provides version information regarding the current version of the system information for the cell;
- detect, via the terminal, the version synchronisation signal from the base station;
- determine, via the terminal and based on the version information, whether the current version of the system information for the cell matches the version of the system information stored in the terminal; use, via the terminal and if the current version of the system information for the cell matches the version of the system information stored in the terminal, the system information stored in the terminal.

Example 30. A method of using system related information in a mobile telecommunications network, the network comprising a base station configured to transmit system information for the cell provided by the base station, the method comprising:
- broadcasting, by the base station, a version synchronisation signal to the plurality of terminals, wherein the version synchronisation signal provides version information regarding the current version of the system information for the cell;
- detecting, by a terminal of the plurality of terminals, the version synchronisation signal from the base station;
- determining, by the terminal and based on the version information, whether the current version of the system information for the cell matches the version of the system information stored in the terminal; if the current version of the system information for the cell matches the version of the system information stored in the terminal, the terminal using the system information stored in the terminal.

Accordingly, from one perspective there has been provided a method of transmitting system related information in a mobile telecommunications network, the network comprising a base station configured to transmit system information for the cell provided by the base station. The method comprises broadcasting, by the base station, a version synchronisation signal (e.g. MSS), wherein the version synchronisation signal provides version information regarding the current version of the system information for the cell. This enables a terminal to determine whether to attempt to receive the system information. In an arrangement where the base station broadcasts a further synchronisation signal (e.g. PSS and/or SSS) that is for use for terminals to achieve synchronisation with the cell (wherein the terminals can then also receive the system information), the version synchronisation signal can be used instead or in addition to the further synchronisation signal when the terminal would normally attempt to receive system information (e.g. after a warm or cold start). As the version synchronisation signal is provided as a synchronisation signal, it can be received by terminals even if they are not yet synchronised with the cell.

Accordingly, from another perspective, there has been provided a terminal for receiving system information in a mobile telecommunications network, the network comprising a base station configured to transmit system information for the cell provided by the base station. The terminal is configured to detect a version synchronisation signal from the base station, the version synchronisation signal providing version information regarding the current version of the system information for the cell; determine, based on the version information, whether the current version of the system information for the cell matches the version of the system information stored in the terminal; and use, if the current version of the system information for the cell matches the version of the system information stored in the terminal, the system information stored in the terminal.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009

The invention claimed is:

1. A terminal for receiving system information in a mobile telecommunications network, the network comprising a base station configured to transmit system information for a cell provided by the base station, the terminal being configured to:

detect a first synchronisation signal from the base station, the first synchronisation signal indicated using a first sequence, including an indication that a current version of the system information has changed compared to a previous version of the system information;

receive a second synchronisation signal transmitted by the base station, wherein the second synchronisation signal, indicated using a second sequence, is for use for terminals to achieve synchronisation with the cell, wherein the first sequence differs from the second sequence;

determine, based on the indication, whether the system information stored in the terminal is valid; and use, if the system information stored in the terminal is valid, the system information stored in the terminal, wherein the second synchronisation signal is transmitted periodically at a first time frequency and the first synchronisation signal is transmitted periodically at a second time frequency, the second time frequency being different than the first time frequency.

2. The terminal of claim 1, further configured to:
attempt, if the system information in the terminal is not valid, to receive the system information provided by the base station.

3. The terminal of claim 1, further configured to:
determine, if the system information in the terminal is not valid, location information from the first synchronisation signal, the location information identifying time and frequency resources for receiving the system information provided by the base station; and
attempt to receive the system information using the location information.

4. The terminal of claim 1, Wherein the second time frequency is higher than the first time frequency.

5. The terminal of claim 1, wherein the first sequence is based on a first scrambling configuration that differs from a second scrambling configuration used to transmit for the second sequence.

6. A base station for transmitting system related information in a mobile telecommunications network, the base station being configured to:

transmit system information for a cell provided by the base station;

broadcast a first synchronisation signal, the first synchronisation signal indicated using a first sequence, including an indication that a current version of the system information has changed compared to a previous version of the system information; and broadcast a second synchronisation signal, wherein the second synchronisation signal, indicated using a second sequence, is for use for terminals to achieve synchronisation with the cell, wherein the first sequence differs from the second sequence, and
the second synchronisation signal is transmitted periodically at a first time frequency and the first synchronisation signal is transmitted periodically at a second time frequency, the second time frequency being different than the first time frequency.

7. The base station of claim 6, wherein broadcast of the second synchronisation signal uses a scrambling configuration that differs from a scrambling configuration used to broadcast the first synchronisation signal.

8. The base station of claim 6, further configured to provide the second synchronisation signal as two or more separate signals forming together the second synchronisation signal.

9. The base station of claim 6, further configured to:
broadcast the second synchronisation signal using two or more separate frequency bands.

10. The base station of claim 9, further configured to broadcast the second synchronisation signal according to one or more of:
- a transmission of a first portion of the second synchronisation signal as a continuous signal in a first of the two or more separate frequency bands or as a non-contiguous signal in the first frequency band; and
- a transmission of a second portion of the second synchronisation signal as a continuous signal in a second of the two or more separate frequency bands or as a non-contiguous signal in the second frequency band.

11. The base station of claim 6, wherein the second time frequency is higher than the first time frequency.

12. A method of transmitting system related information in a mobile telecommunications network, the network comprising a base station configured to transmit system information for the cell provided by the base station, the method comprising:
- transmitting system information for a cell provided by the base station;
- broadcasting a first synchronisation signal, the first synchronisation signal indicated using a first sequence, including an indication that a current version of the system information has changed compared to a previous version of the system information; and
- broadcasting a second synchronisation signal, wherein the second synchronisation signal, indicated using a second sequence, is for use for terminals to achieve synchronisation with the cell, wherein the first sequence differs from the second sequence, and the second synchronisation signal is transmitted periodically at a first time frequency and the first synchronisation signal is transmitted periodically at a second time frequency, the second time frequency being different than the first time frequency.

13. The method of claim 12, wherein broadcast of the second synchronisation signal uses a scrambling configuration that differs from a scrambling configuration used to broadcast the first synchronisation signal.

14. The method of claim 12, further configured to provide the second synchronisation signal as two or more separate signals forming together the second synchronisation signal.

15. The method of claim 12, further configured to:
- broadcast the second synchronisation signal using two or more separate frequency bands.

16. The method of claim 15, further configured to broadcast the second synchronisation signal according to one or more of:
- a transmission of a first portion of the second synchronisation signal as a continuous signal in a first of the two or more separate frequency bands or as a non-contiguous signal in the first frequency band; and
- a transmission of a second portion of the second synchronisation signal as a continuous signal in a second of the two or more separate frequency bands or as a non-contiguous signal in the second frequency band.

17. The method of claim 12, wherein the second time frequency is higher than the first time frequency.

* * * * *